(No Model.)

C. SCHIFFERLY.
BAKE PAN.

No. 504,480. Patented Sept. 5, 1893.

Witnesses
Harry L. Ames.
N. J. Riley

Inventor
Conrad Schifferly.
By his Attorneys,
C. A. Snow & Co.

UNITED STATES PATENT OFFICE.

CONRAD SCHIFFERLY, OF FORT WAYNE, INDIANA.

BAKE-PAN.

SPECIFICATION forming part of Letters Patent No. 504,480, dated September 5, 1893.

Application filed February 8, 1893. Serial No. 461,495. (No model.)

*To all whom it may concern:*

Be it known that I, CONRAD SCHIFFERLY, a citizen of the United States, residing at Fort Wayne, in the county of Allen and State of Indiana, have invented a new and useful Bake-Pan, of which the following is a specification.

The invention relates to improvements in bake pans.

The object of the present invention is to improve the construction of bake pans and roasters, and to enable corrugated bottoms to be advantageously employed without liability of the bottoms wearing out at the creases or bends.

The invention consists in the construction and novel combination and arrangement of parts hereinafter fully described, illustrated in the accompanying drawings and pointed out in the claims hereto appended.

Figure 1:
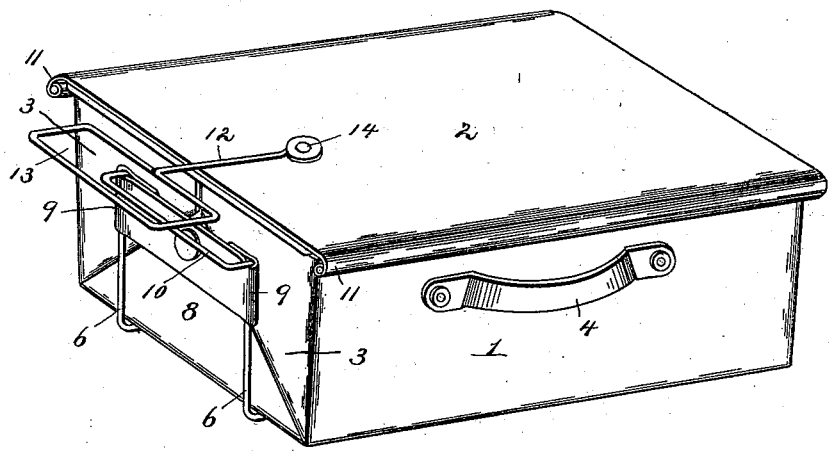
Figure 2:
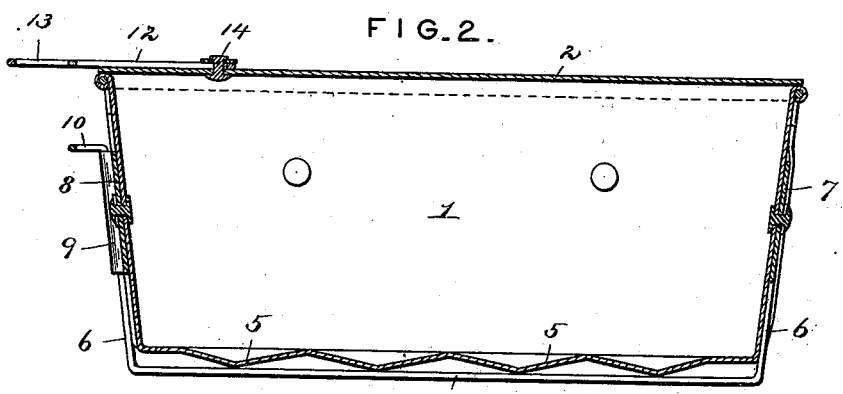
Figure 3:
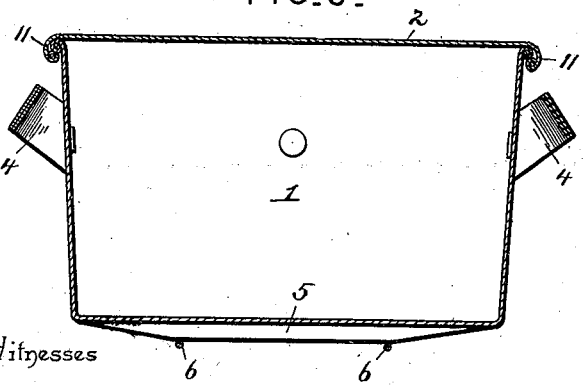
Figure 4:
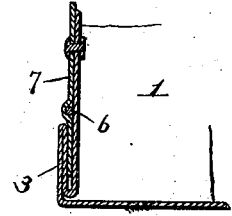

In the drawings—Figure 1 is a perspective view of a bake pan and roaster embodying the invention. Fig. 2 is a longitudinal sectional view. Fig. 3 is a transverse sectional view. Fig. 4 is a detail horizontal sectional view of one corner of the pan.

Like numerals of reference indicate corresponding parts in all the figures of the drawings.

1 designates a pan for baking and roasting, having a cover 2 and constructed of a single piece of sheet metal, which is folded at the corners of the pan at 3. The pan is provided at opposite sides with handles 4, and has its upper edge beaded and provided with a stiffening wire, arranged in the bead. The bottom of the pan is provided with a series of corrugations 5 to form spaces at the bottom of the pan to facilitate cooking. In order to prevent the bottom wearing out rapidly at the creases of the corrugations 5 through sliding the pan in and out of an oven, the pan is provided with parallel longitudinally disposed supporting wires 6. The opposite supporting wires are preferably constructed of a single piece of wire and extended down the ends of the pan and along the bottom thereof and secured thereto by metal strips 7 and 8. The metal strip 8 is provided at its ends with eyes 9 and receives the supporting wires at one end of the pan adjacent to the integral cross-piece 10, which is bent outward to form an end handle, to enable the pan to be readily placed in and removed from an oven. The strip 7 has its ends secured beneath the folds of the pan and the adjacent ends of the wire are fastened securely between the strip 7 and the end of the pan. The cover of the pan has its side edges 11 curved downward and inward and provided with beads having strengthening and stiffening wires; and these edges or flanges 11 are adapted to embrace and engage under the longitudinal beads of the upper edge of the pan. By this construction the pan is adapted to have its cover placed on it from either end, and the cover is adapted to be moved longitudinally in either direction to provide an opening at either end of the pan as may be found necessary or desirable in cooking. At one end the cover is provided with a pivoted handle 12 adapted to swing to either side of the pan and constructed of a single piece of wire which is bent to form a rectangular hand loop 13 at one end and at the other end to form an eye to receive a rivet 14.

It will be seen that the pan is adapted for cooking in an advantageous and effective manner, that the cover may be placed on the pan at either end and may be moved longitudinally to provide an opening at either end of the pan, and that the corrugations are protected from wear.

Changes in the form, proportion and the minor details of construction may be resorted to without departing from the principle or sacrificing any of the advantages of this invention.

What I claim is—

1. A bake pan having a corrugated bottom and provided with longitudinal supporting wires, arranged on the lower face of the bottom, and extending upward at the ends of the pan and secured thereto, said wires being constructed of a single piece of wire and having an integral connecting portion 10 bent to form a handle and arranged on one end of the pan, substantially as described.

2. A bake pan having a corrugated bottom and provided with longitudinal supporting wires, arranged on the bottom and the ends of the pan and having an integral connecting portion, combined with strips securing the supporting wires to the pan, one of the strips being provided with eyes receiving the supporting wires adjacent to the integral connecting portion, substantially as described.

3. A bake pan having a sliding cover provided with a pivoted handle, constructed of a single piece of wire bent at its inner end to form an eye and at its outer end to form a loop, substantially as described.

In testimony that I claim the foregoing as my own I have hereto affixed my signature in the presence of two witnesses.

CONRAD SCHIFFERLY.

Witnesses:
JAMES E. GRAHAM,
MAUD GRAHAM.